(12) United States Patent
Nilsson (10) Patent No.: US 7,609,791 B2
(45) Date of Patent: Oct. 27, 2009

(54) ITERATIVE DECODING WITH INTENTIONAL SNR/SIR REDUCTION

(75) Inventor: Johan Nilsson, Höllviken (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 597 days.

(21) Appl. No.: 11/379,603

(22) Filed: Apr. 21, 2006

(65) Prior Publication Data

US 2007/0248190 A1    Oct. 25, 2007

(51) Int. Cl.
*H03D 1/04* (2006.01)
(52) U.S. Cl. ..................................... 375/346
(58) Field of Classification Search ............... 375/262, 375/265, 340–342, 346, 348, 350; 455/522
See application file for complete search history.

(56) References Cited

U.S. PATENT DOCUMENTS

| | | | |
|---|---|---|---|
| 5,305,349 A | | 4/1994 | Dent |
| 6,363,104 B1 | | 3/2002 | Bottomley |
| 6,415,137 B1 | * | 7/2002 | Hayashi ..................... 455/70 |
| 6,542,558 B1 | | 4/2003 | Schulist et al. |
| 6,591,390 B1 | | 7/2003 | Yagyu |
| 6,771,978 B1 | | 8/2004 | Kayama et al. |
| 6,801,565 B1 | | 10/2004 | Bottomley et al. |
| 7,069,039 B2 | * | 6/2006 | Shinozaki ................... 455/522 |
| 7,372,921 B2 | * | 5/2008 | Park et al. ................... 375/341 |
| 2001/0028677 A1 | | 10/2001 | Wang et al. |
| 2002/0049952 A1 | * | 4/2002 | Lee et al. .................... 714/786 |
| 2002/0187802 A1 | | 12/2002 | Agin et al. |
| 2004/0259584 A1 | | 12/2004 | Murata et al. |
| 2005/0003848 A1 | | 1/2005 | Chen et al. |
| 2005/0085256 A1 | | 4/2005 | Yano et al. |
| 2005/0091568 A1 | | 4/2005 | Levy et al. |
| 2005/0105647 A1 | | 5/2005 | Wilhelmsson et al. |
| 2005/0143112 A1 | | 6/2005 | Jonsson |
| 2006/0171449 A1 | | 8/2006 | Lindoff |

FOREIGN PATENT DOCUMENTS

| | | |
|---|---|---|
| EP | 1 146 667 A1 | 10/2001 |
| EP | 1 146 758 A1 | 10/2001 |
| EP | 1 267 500 A1 | 12/2002 |
| GB | 2 405 562 A | 3/2005 |

(Continued)

OTHER PUBLICATIONS

Kawai, H. et al., "Outer-loop control of target SIR for fast transmit power control in turbo-coded W-CDMA mobile radio", IEEE Electronics Letters vol. 35, No. 9, Apr. 29, 1999, pp. 699-701. On-line No. 19990481.

(Continued)

*Primary Examiner*—Khanh C Tran
(74) *Attorney, Agent, or Firm*—Potomac Patent Group PLLC (57) ABSTRACT

The excess signal-to-interference ratio (SIR) or the like of a communication channel is determined by repeatedly decoding received information with successively reduced effective SIR. The step size in an outer power control algorithm, for example a Jump Algorithm, such as that commonly used for transmit power control in communication systems can then be adaptively adjusted based on the excess SIR, enabling faster convergence. Decoder hardware already present in a user equipment, such as a mobile telephone or other receiver, can advantageously be used.

22 Claims, 4 Drawing Sheets

FOREIGN PATENT DOCUMENTS

| | | |
|---|---|---|
| WO | 02/35730 A2 | 5/2002 |
| WO | 03/055098 A1 | 7/2003 |
| WO | 2004/025973 A1 | 3/2004 |
| WO | 2004/034605 A1 | 4/2004 |
| WO | 2004/034695 A1 | 4/2004 |
| WO | 2005/041439 A2 | 5/2005 |

OTHER PUBLICATIONS

Jalloul, L. et al., "SIR Estimation and Closed-Loop Power Control for 3G", IEEE, Mar. 2003, 0-7803-7954.

3GPP TS 25.214 V6.3.0 Technical Specification Group Radio Access Network; Physical layer procedures (FDD) (Release 6), Section 5.2.3.1, Sep. 2004.

European Patent Office, International Search Report in Intl Application No. PCT/EP2007/053844, pp. 1-3, Jun. 25, 2007.

European Patent Office, Written Opinion in Intl Application No. PCT/EP2007/053844, pp. 1-5, Jun. 25, 2007.

* cited by examiner

ITERATIVE DECODING WITH INTENTIONAL SNR/SIR REDUCTION

BACKGROUND

This invention relates to electronic digital communication systems and more particularly to receivers in wireless communication systems.

Digital communication systems include time-division multiple access (TDMA) systems, such as cellular radio telephone systems that comply with the GSM telecommunication standard and its enhancements like GSM/EDGE, and code-division multiple access (CDMA) systems, such as cellular radio telephone systems that comply with the IS-95, cdma2000, and wideband CDMA (WCDMA) telecommunication standards. Digital communication systems also include "blended" TDMA and CDMA systems, such as cellular radio telephone systems that comply with the universal mobile telecommunications system (UMTS) standard, which specifies a third generation (3G) mobile system being developed by the European Telecommunications Standards Institute (ETSI) within the International Telecommunication Union's (ITU's) IMT-2000 framework. The Third Generation Partnership Project (3GPP) promulgates the UMTS and WCDMA standards. This application focusses on WCDMA systems for simplicity, but it will be understood that the principles described in this application can be implemented in other digital communication systems, including fourth generation (4G) systems that are under discussion and development.

WCDMA is based on direct-sequence spread-spectrum techniques, with pseudo-noise scrambling codes and orthogonal channelization codes separating base stations and physical channels (terminals or users), respectively, in the downlink (base-to-terminal) direction. Since all users share the same radio frequency (RF) resource in CDMA systems, it is important that each physical channel does not use more power than necessary if system capacity is not to be wasted. This is achieved by a transmit power control (TPC) mechanism, in which, among other things, base stations send TPC commands to users in the downlink (DL) direction and the users implement the commands in the uplink (UL) direction and vice versa. The TPC commands cause the users to increase or decrease their transmitted power levels by increments, thereby maintaining target signal-to-interference ratios (SIRs) for the dedicated physical channels (DPCHs) between the base stations and the users. The DPCHs include dedicated physical data channels (DPDCHs) and dedicated physical control channels (DPCCHs) in the UL and the DL. A DPDCH carries higher-layer network signaling and possibly also speech and/or video services, and a DPCCH carries physical-layer control signaling (e.g., pilot symbols/signals, TPC commands, etc.). WCDMA terminology is used here, but it will be appreciated that other systems have corresponding terminology. Scrambling and channelization codes and transmit power control are well known in the art.

Figure 1:
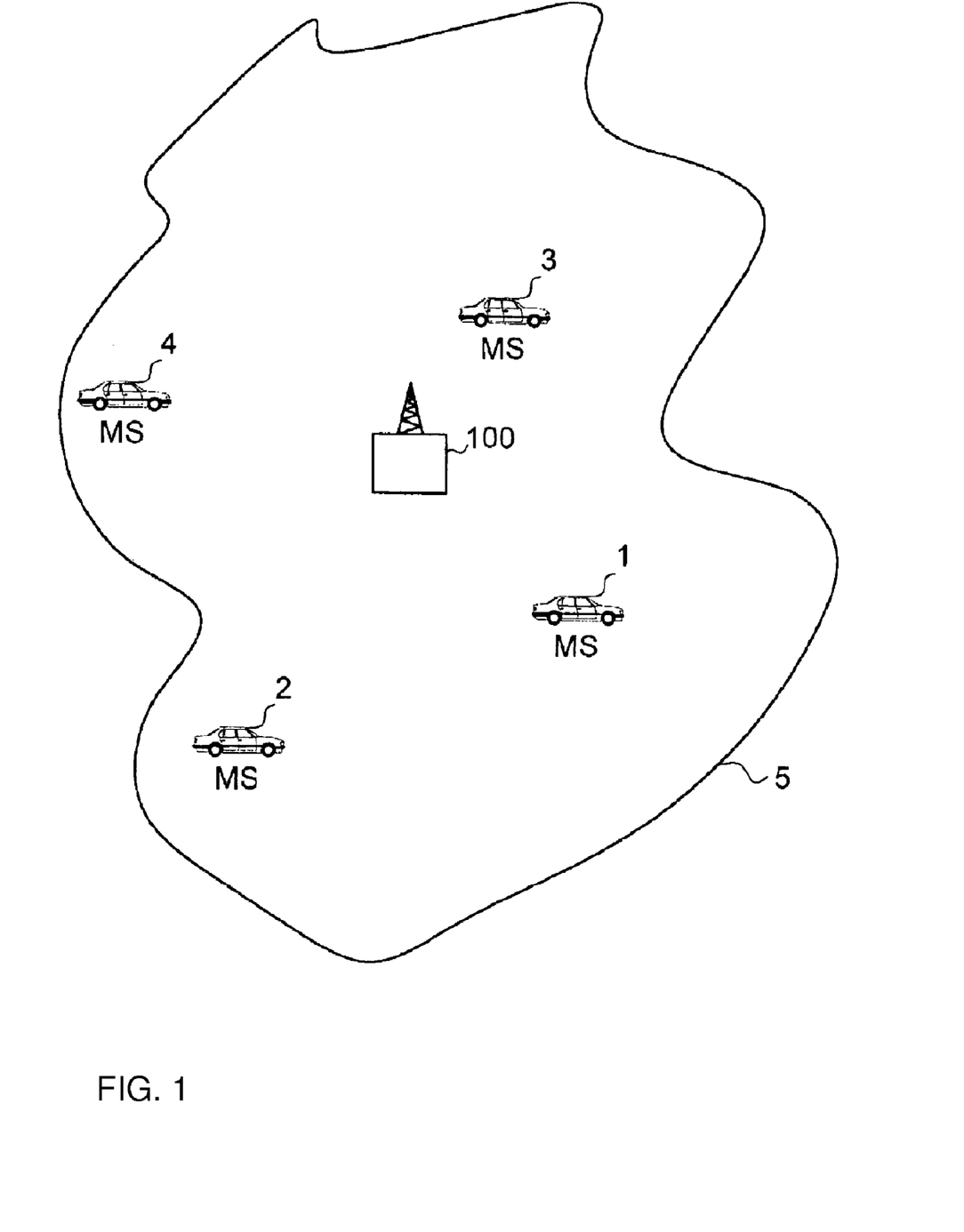
FIG. 1 depicts a digital communication system.

FIG. 1 depicts a communication system such as a WCDMA system that includes a base station (BS) 100 handling connections with, in this example, four mobile stations (MSs) 1, 2, 3, 4. In the downlink, BS 100 transmits to each mobile station at a respective power level, and the signals transmitted by BS 100 are spread using orthogonal code words. In the uplink, MS 1-MS 4 transmit to BS 100 at respective power levels. Each BS, which is called a Node B in 3GPP parlance, in the system serves a geographical area that can be divided into one or more cell(s). The BSs are coupled to corresponding radio network controllers (RNCs, not shown in FIG. 1) by dedicated telephone lines, optical fiber links, microwave links, etc. An RNC directs MS, or user equipment (UE), calls via the appropriate BSs, and the RNCs are connected to external networks such as the public switched telephone network (PSTN), the Internet, etc. through one or more core network nodes, such as a mobile switching center (not shown) and/or a packet radio service node (not shown).

WCDMA is designed to operate at low signal-to-noise ratios (SNRs) or SIRs, and therefore the WCDMA algorithms, for instance, SIR estimation algorithms and automatic frequency control (AFC) algorithms, are designed for such scenarios. It will be understood that SNR and SIR are substantially interchangeable in a communication system such as a CDMA system in which interferers (e.g., other users) are noise-like. For example, the SIR estimation algorithm, which is used in the TPC scheme to achieve sufficient quality of service (QoS), is designed to be used at low SIRs. QoS is often quantified by block error rate (BLER). It will be understood that, in WCDMA systems (and other communication systems that employ direct-sequence (DS) spread-spectrum techniques), the noise (N) includes thermal noise and interference because the spreading of the signals makes interference signals appear noise-like (i.e., spread out in frequency and with a level in the noise floor) due to the interference signals' "wrong" spreading codes.

Power control in most modern CDMA communication systems is handled by a combination of an outer loop TPC and an inner loop TPC. The SIR is used for the inner loop because it is assumed to have an almost one-to-one mapping to the BLER. The outer loop, which operates with a slower response rate than the inner loop, compensates for residual mismatch between the SIR and the BLER. TPC and SIR-to-BLER mapping are well known in the art, and are described in, for example, U.S. Patent Application Publication No. US 2005/0143112 by Jonsson, U.S. Pat. No. 6,771,978 to Kayama et al., and Louay M. A. Jalloul et al., "SIR Estimation and Closed-Loop Power Control for 3G", Proc. 58th Vehicular Technology Conf., pp. 831-835, IEEE, Orlando, Fla. (October 2003).

In a communication system such as that depicted by FIG. 1, the BS transmits predetermined pilot symbols on the UE's DPCH. The BS also transmits pilot symbols on a common pilot channel (CPICH), and a UE typically uses the CPICH pilot symbols in estimating the impulse response of the radio channel to the BS. It will be recognized that the UE uses the CPICH pilots for channel estimation, rather than the DPCH pilots, due to the CPICH's typically higher SNR. The UE uses the DPCH pilots mainly for SIR estimation, i.e., for DL TPC.

For example, Section 5.2.3.1 of 3GPP TS 25.214, "Physical Layer Procedures (FDD) (Release 6)", ver. 6.3.0 (September 2004) specifies that the UE shall generate TPC commands to control the network transmit power and send them in a TPC field of the UL DPCCH. Annex B.2 of TS 25.214 describes the UE's generating TPC commands for the DPCCH/DPDCH based on an estimate of the actual SIR and on a SIR reference, or target. The SIR estimate $SIR_{est}$ is used with the SIR target $SIR_{ref}$ by the UE to generate TPC commands according to the following rule:

if $SIR_{est} > SIR_{ref}$, generate a TPC command requesting a power decrease, and if $SIR_{est} < SIR_{ref}$, then generate a TPC command requesting a power increase.

It has been observed that the response of the outer loop TPC can become slow for low BLER reference, or target, levels. Such levels are commonly called "BLER targets". Many outer loop algorithms in today's wireless communication systems use variants of a so-called "Jump Algorithm", which can be expressed by the following set of equations:

$$SIR_{ref}(k+1) = SIR_{ref}(k) + SIR_{inc}, \text{ if CRC is not OK, and}$$

$$SIR_{ref}(k+1) = SIR_{ref}(k) - SIR_{inc} \cdot BLER_{ref}/(1 - BLER_{ref}), \text{ if CRC is OK}$$

in which $SIR_{inc}$ is a SIR increment value; k is an index that is usually equivalent to time or time slot; $BLER_{ref}$ is a BLER target; and CRC is a cyclic redundancy check value that is included in the received block at index k and is used to determine whether the block is correctly received or not.

Figure 2:
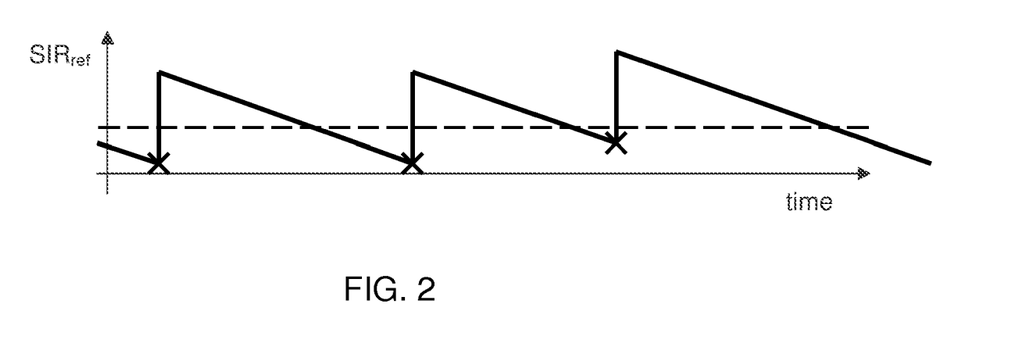
FIG. 2 depicts the behavior of a Jump Algorithm having a fixed down-step.

The BLER target is usually chosen by higher layers in the system to be low to minimize the BLER, but the Jump Algorithm has a very slow "down convergence", especially for low BLER targets. For example, if $SIR_{inc}=1$ dB and $BLER_{ref}=0.01$, then each downward step is fixed at only 0.01 dB. This typical behavior of the Jump Algorithm is illustrated in FIG. 2, which shows the SIR target as a "sawtooth" function of time and in which occurrences of block errors are indicated by Xs. The behavior of the typical Jump Algorithm can be seen to waste system capacity by allowing a channel to use higher SIR targets for longer times than are necessary, which is indicated in FIG. 2 by the dashed line.

There are proposals to improve such slow down convergence by using cascade controllers, where a "middle" power control loop is used to react faster to changed propagation conditions than the outer loop. The middle loop can for instance be based on bit error rate (BER), soft value quality, etc. These techniques also may have faster convergence in general. Nevertheless, there is a need for methods of faster-converging outer loop power control.

SUMMARY

Accordingly, there is provided in one aspect of this invention a method of determining an excess signal-to-interference ratio (SIR) of a channel in a communication system. The method includes the steps of decoding an information block received through the channel; if the information block is decoded correctly, then reducing an effective SIR of the received information block and decoding the information block with the reduced effective SIR; and determining an excess SIR of the channel based on the decoding of the information block with the reduced effective SIR. The excess SIR is related to a difference between the SIR of the received information block and a minimum SIR needed for decoding the received information block.

In another aspect of the invention, there is provided an apparatus for a communication system that includes a decoder configured to decode received information blocks and to generate respective flag signals that indicate whether respective information blocks are correctly decoded. The apparatus also includes an excess SIR estimator configured to receive the flag signals, to cause the decoder to decode at least one already decoded information block with a reduced effective SIR, and to generate an estimate of an excess SIR based on the decoded information block with the reduced effective SIR.

In another aspect of this invention, there is provided a computer-readable medium containing a computer program for determining an excess SIR of a channel in a communication system. The computer program implements the steps of decoding an information block received through the channel; if the information block is decoded correctly, then reducing an effective SIR of the received information block and decoding the information block with the reduced effective SIR; and determining an excess SIR of the channel based on the decoding of the information block with the reduced effective SIR. The excess SIR is related to a difference between the SIR of the received information block and a minimum SIR needed for decoding the received information block.

BRIEF DESCRIPTION OF THE DRAWINGS

The features, objects, and advantages of this invention will be understood by reading this description in conjunction with the drawings, in which.

DETAILED DESCRIPTION

This application describes methods and apparatus for determining the "excess" SIR of a communication channel. One advantageous way to do this is to use the decoder hardware in a user equipment, such as a mobile telephone or other receiver, to not only decode received blocks of information, but also to determine how much excess SIR the blocks have. In a typical WCDMA receiver, such decoder hardware can be a Turbo decoder or a convolutional decoder that may be implemented by, for example, a suitably programmed processor, an application-specific integrated circuit (ASIC), or a combination of them. The "excess" SIR can be quantified in many equivalent ways, one of which is the difference between the SIR of a received signal and the minimum SIR that is necessary to decode or otherwise successfully process the received signal.

It will be understood that this invention is not limited to WCDMA receivers or even to wireless receivers. As described below, this invention can be advantageously embodied in methods and apparatus in a WCDMA receiver as described below for adaptively adjusting the size of the down-step in outer power control algorithms, such as the Jump Algorithm, thereby enabling faster down-convergence of an outer loop TPC. Nevertheless, it will also be understood that the invention is not limited to the Jump Algorithm or to TPC. Moreover, it will be understood that the SIR is used in this application for simplicity of explanation, and thus the term "SIR" will be understood to include also other measures, such as the SNR, in this application.

A method of determining the excess SIR of a channel, with steps for adapting the down-step of a Jump Algorithm based on the excess SIR, advantageously involves repeatedly decoding one or more received blocks. As depicted by the flow chart shown in FIG. 3, the method may begin with steps of getting and decoding a received block of information (steps 302, 304). These steps may be carried out in the usual way for a receiver in the particular communication system. If the block is decoded correctly, which can be indicated for example by the block's respective CRC or other parity-check or integrity-verifying information (Yes in step 306), the SIR of the received block is effectively reduced as described below (step 308), and the block is decoded again (step 304).

Figure 3:
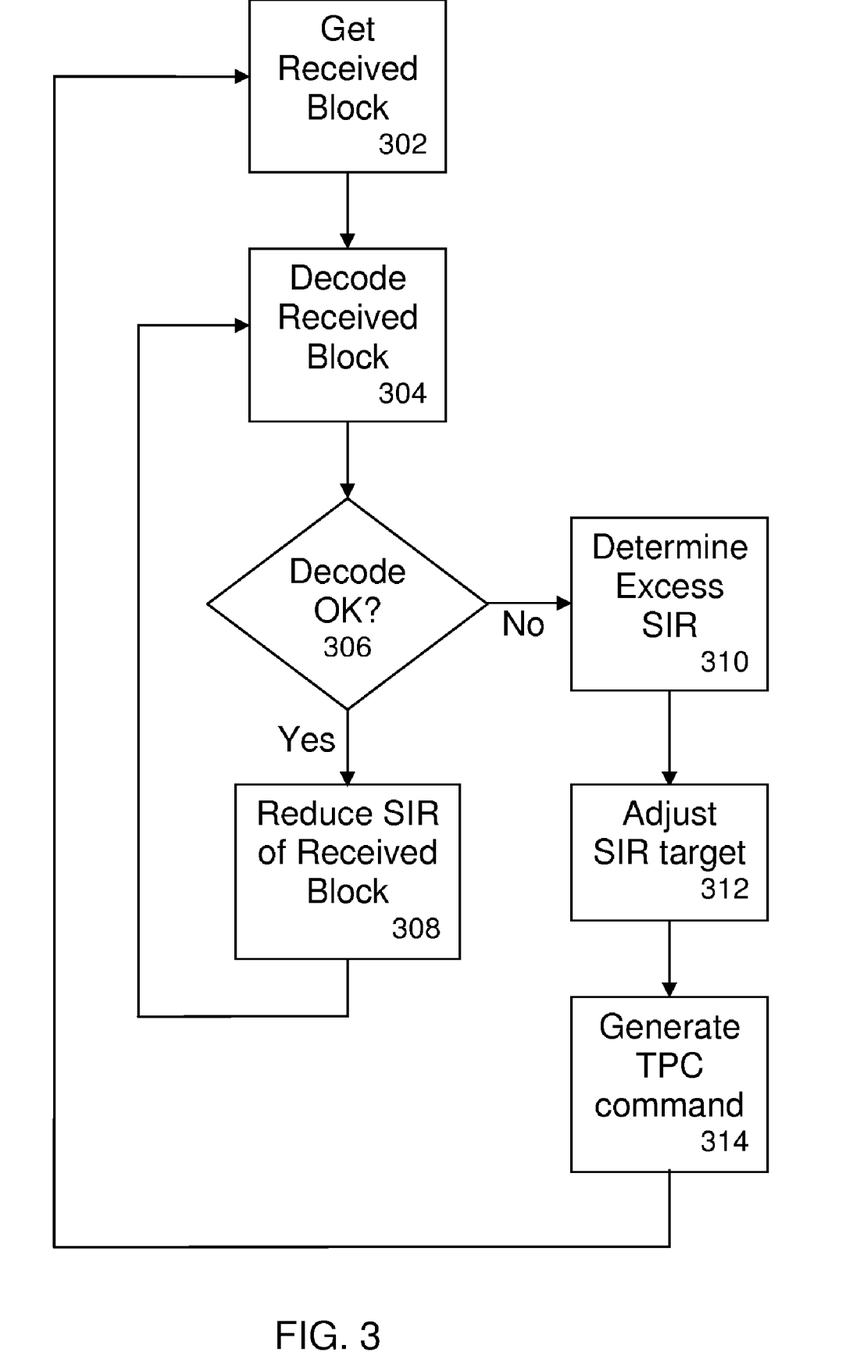
FIG. 3 is a flow chart of a method of determining excess SIR of a channel.

If the block is again decoded correctly, the block can be decoded yet again with an even lower effective SIR by repeating the steps 308, 304.

After some number of decodings, even sometimes after the first decoding, the block will not be decoded correctly (No in step 306). At that point, how much excess SIR the channel has, if any, can be determined (step 310). If the loop aborts after only repeat of step 304 or if the receiver has time for only one repeat before it receives the next block, it can be determined at least that there is an excess SIR of a certain size, i.e., the amount of the decrease in step 308. The resolution of this determination depends on the size of the SIR decrease in step 308, and that size, which may be fixed, reflects a trade-off among system complexity, power consumption, time delay, and estimation accuracy. For a higher resolution estimate of the excess SIR, one can use many strategies typical of known search algorithms in numerical analysis, such as the interval-halving or bisection method, which is a root-finding algorithm that divides an interval in half, selects the sub-interval in which the root exists, divides that sub-interval in half, selects again, and so on.

The estimate of the excess SIR generated in step 310 is useful, for example for adjusting the step $SIR_{inc}$ in the Jump Algorithm and thus adjusting the SIR target $SIR_{ref}$ (step 312). Based on an adaptively adjusted up- or down-step, an adaptive TPC command can be generated (step 314), for example in the manner described in 3GPP TS 25.214 and similar standards.

If the excess SIR estimate is large, for example of the order of 1 dB, it is usually desirable to take a larger down-step than is taken by the typical Jump Algorithm or if the excess SIR estimate is small, for example of the order of 0.1 dB. A down-step can simply be a fraction of the excess SIR. If the excess SIR estimate is small, it can be desirable to take a smaller down-step than is taken by the typical Jump Algorithm. It can also be desirable to leave the SIR target unchanged or even to increase it in some circumstances, e.g., when it is important to avoid block error(s) for a particular time or when a smoothed, or filtered, BLER estimate is higher than a target BLER. If the smoothed BLER estimate is lower than the target BLER, it can also be desirable to "gamble" and decrease the SIR target even when the excess SIR estimate is small.

It will be understood that if an information block does not decode correctly on the first decoding, it can be concluded in step 310 that the excess SIR is less than zero. Thus, the SIR target could be left unchanged in step 312 or even increased by an up-step. It will be understood that with a proportional, integral, derivative (PID) controller and other more complicated controllers, i.e., controllers having more complicated internal states than a Jump Algorithm controller, there can be a down-step even after a block error. The up- and down-steps can also be adapted to different communication systems, different types of information (voice or data), or different propagation conditions (large cell/small cell).

An effective SIR of a received block can be intentionally decreased in many suitable ways. For example, a selected amount of pseudo-noise can be added by a demodulator in the receiver to soft decision values generated by the decoder. Pseudo-noise generation, e.g., with pseudo-random number generators, is known in the art. As an alternative, the decoder can change parameters of the coding it expects a block to have, e.g., its code rate and/or puncturing. As another alternative, the decoder can change its soft-value quantization (e.g., change 4-bit quantization to 3-bit, 3-bit quantization to 2-bit, or 2-bit quantization to 1-bit). It will be understood that there may be other alternatives for reducing a block's effective SIR that could be useful and that these alternatives can be suitably combined.

The amount of noise to add also can be determined in a number of ways. If the SIR of a received block or an estimate of it is known, one can mathematically determine how much noise power to add to decrease the SIR or SIR estimate to a given value. For example, it can be assumed that the received signal has a SIR equal to the SIR target, although this assumption may be erroneous if the transmitter, e.g., a base station, does not follow the generated TPC commands. For another example, the SIR of the received information can be estimated in a known way. As noted below, SIR estimation is carried out continuously in a WCDMA user equipment for the inner loop TPC.

Figure 4:
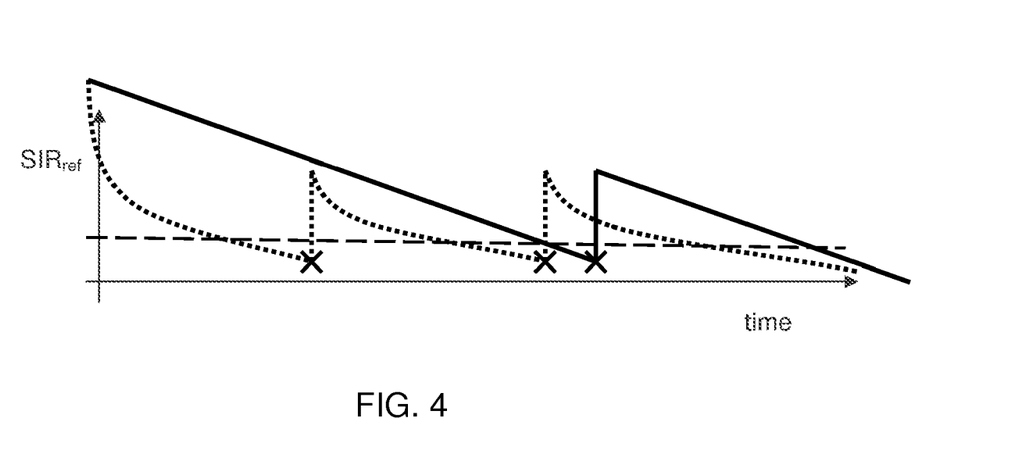
FIG. 4 depicts the behavior of a modified Jump Algorithm having an adaptive down-step.

Using a method such as that depicted in FIG. 3, it may be determined that received blocks have more than the SIR level needed for proper decoding, and then a step down can be made in the modified Jump Algorithm that is larger than the usual fixed small steps done by the conventional Jump Algorithm. Such an adapted SIR trajectory may then look like the dotted line shown in FIG. 4, which like FIG. 2 shows the SIR target as a function of time and in which occurrences of block errors are indicated by Xs. For convenience, a possible behavior of the conventional Jump Algorithm is shown in FIG. 4 as a solid "sawtooth". In comparison to the behavior of the conventional algorithm, the behavior of the modified adaptive Jump Algorithm can be seen to waste less system capacity by allowing a channel to use lower SIR targets for shorter times than are necessary, which is indicated in FIG. 4 by the dashed line. When a large excess SIR is found, a larger down-step is done. This is in contrast to the Jump Algorithm that always does the same-size (small) down-steps. Faster convergence and less capacity waste are achieved by modifying an outer loop TPC according to this invention.

It is currently believed that implementing the adaptive Jump Algorithm with repeated decoding described here is within the capabilities of current user equipments. Decoders are so fast in today's technologies and will be faster in future technologies that it is and will be feasible to do one or several extra decodings for a block as outlined above before the next block is received. Thus, the outer loop TPC can converge faster, which means better system capacity, etc.

Figure 5:
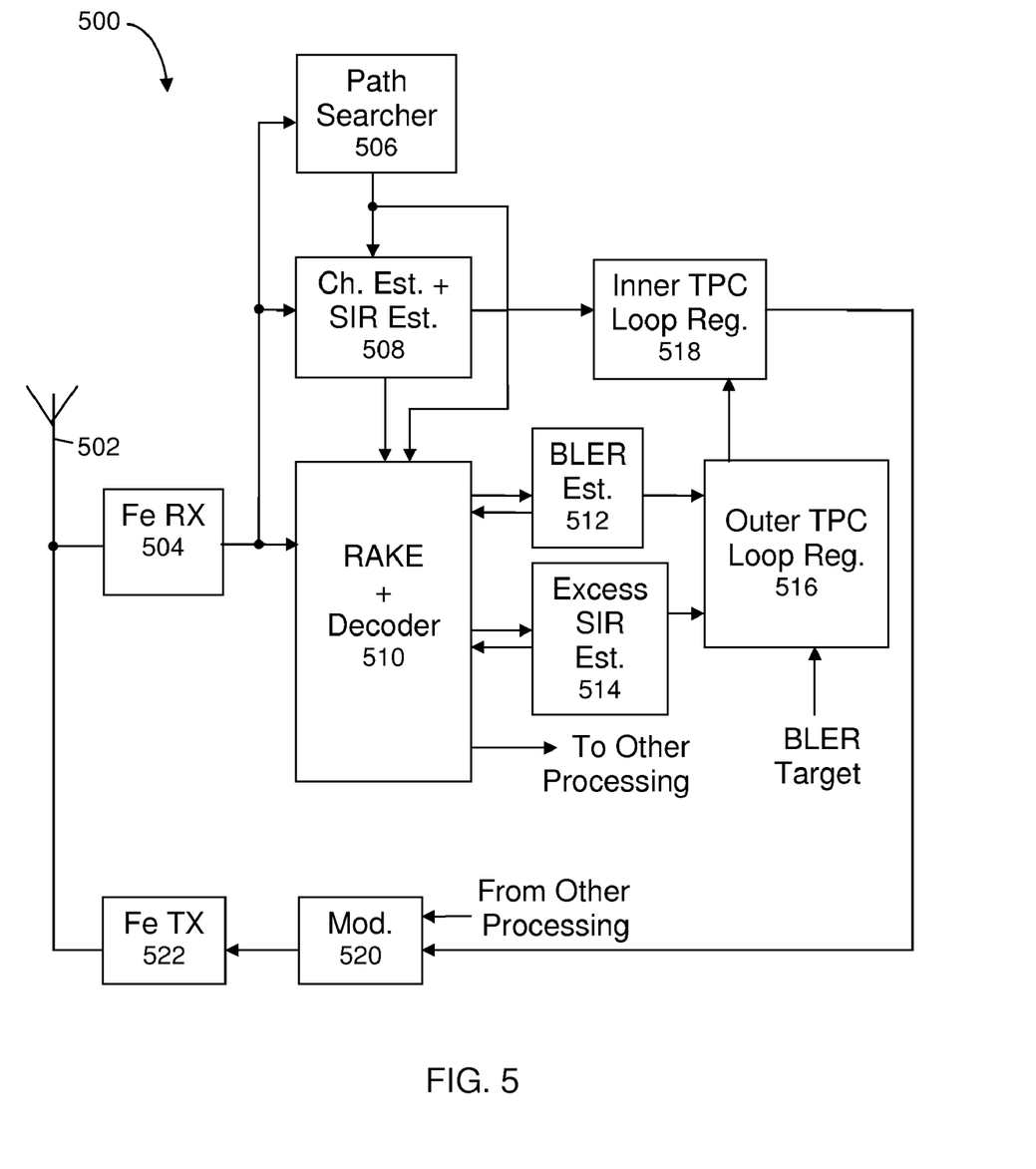
FIG. 5 is a block diagram of an exemplary user equipment in a communication system that can use the modified adaptive Jump Algorithm.

FIG. 5 is a block diagram of a portion of a UE 500, such as a mobile station in a WCDMA communication system, that is in accordance with aspects of this invention. A radio signal is received by a suitable antenna or antennas 502 and down-converted and sampled to a baseband signal by a front-end receiver (Fe RX) 504. The samples of the baseband signal are then fed to a path searcher 506 that correlates the received signal samples with known pilot signals and estimates a path delay profile, which is fed to a channel estimator and SIR estimator 508 and to a RAKE combiner and decoder 510. The estimators 508 and combiner/decoder 510 de-spread the pilot channel, estimate the impulse response and SIR of the radio channel, and de-spread, combine, and decode received echoes of the received data and control symbols. Other blocks in FIG. 5 are described below, and it will be understood that the receiver can be implemented by other arrangements of the functional blocks shown in FIG. 5.

Channel estimation, RAKE combining, and SIR estimation are well known in the art. Channel estimation is described in, for example, U.S. Patent Application Publication No. 2005/0105647 by Wilhelmsson et al. for "Channel Estimation by Adaptive Interpolation". Aspects of RAKE receivers are described in U.S. Pat. No. 5,305,349 to Dent for "Quantized Coherent Rake Receiver"; U.S. Pat. No. 6,363,104 to Bottomley for "Method and Apparatus for Interference Cancellation in a Rake Receiver"; and U.S. Pat. No. 6,801,565 to Wang et al. for "Multi-Stage Rake Combining Methods and Apparatus"; and U.S. Patent Application Publication No. 2001/0028677 by Wang et al. for "Apparatus and Methods for Finger Delay Selection in Rake Receivers". Aspects of SIR estimation are described in, for example, U.S. patent application Ser. No. 11/177,532 filed on Jul. 8, 2005, by Lindoff et al. for "Interference Estimation in the Presence of Frequency Errors".

As depicted by FIG. 5, the combiner/decoder 510 provides decoded blocks to other processing components in the UE 500 and provides error flags to a BLER estimator 512 and an excess-SIR estimator 514. The error flags, which may be one-bit signals, indicate whether the current block has been correctly decoded, for example based on its CRC. As described above in connection with FIG. 3, the excess-SIR estimator 514 returns a control signal and/or other information to the decoder 510 that results in a repeated decoding of the current block but with a reduced effective SIR. If the error flag indicates that the current block has not been correctly decoded, the excess-SIR estimator 514 generates an estimate of the excess SIR, and provides that information to an outer loop regulator 516, which generates a SIR target $SIR_{ref}$ based on that information and on a BLER target $BLER_{ref}$, which may be predetermined and stored in a suitable memory (not shown). As shown, the regulator 516 also receives a BLER estimate from the estimator 512. It will be appreciated that the estimators 512, 514 may include suitable filters or averagers for smoothing the estimates they generate.

The SIR target $SIR_{ref}$ produced by the outer loop regulator 516 may be provided to an inner loop regulator 518, which also receives SIR estimates from the estimators 508. Based on the SIR targets and SIR estimates, the inner loop regulator 518 generates TPC commands that the UE 500 sends to a BS (not shown) via a suitable modulator 520 and front-end transmitter (Fe TX) 522, and the antenna 502. The modulator 520 and Fe TX 522 also communicate information from other processing components in the UE500 to the BS.

It will be appreciated that procedures described above are carried out repetitively as necessary, for example, to respond to the time-varying nature of communication channels between transmitters and receivers. In addition, this description is written in terms of channels such as the DPCH and CPICH, but it will be understood that other channels, including uplink channels, may also be suitable. Thus, although this description is written in terms of the downlink, it will be understood that the methods and apparatus described here can be implemented in a base station or other uplink receiving node.

To facilitate understanding, many aspects of this invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both. Wireless receivers implementing embodiments of this invention can be included in, for example, mobile telephones, pagers, headsets, laptop computers and other mobile terminals, and the like.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, or transport the program for use by or in connection with the instruction-execution system, apparatus, or device. The computer-readable medium can be, for example but not limited to, an electronic, magnetic, optical, electromagnetic, infrared, or semiconductor system, apparatus or device. More specific examples (a non-exhaustive list) of the computer-readable medium include an electrical connection having one or more wires, a portable computer diskette, a random-access memory (RAM), a read-only memory (ROM), and an erasable programmable read-only memory (EPROM or Flash memory).

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A method of determining an excess signal-to-interference ratio of a channel in a communication system, comprising the steps of:
    decoding, in a receiver, an information block received through the channel;
    if the information block is decoded correctly, then reducing, in the receiver, an effective signal-to-interference ratio of the received information block and decoding the information block with the reduced effective signal-to-interference ratio; and
    determining an excess signal-to-interference ratio of the channel based on the decoding of the information block with the reduced effective signal-to-interference ratio;
    wherein the excess signal-to-interference ratio is related to a difference between the signal-to-interference ratio of the received information block and a minimum signal-to-interference ratio needed for decoding the received information block.

2. The method of claim 1, further comprising the steps of, if the information block with the reduced effective signal-to-interference ratio is decoded correctly, further reducing the effective signal-to-interference ratio of the received information block and decoding the information block with the further reduced effective signal-to-interference ratio, wherein the excess signal-to-interference ratio of the channel is determined based on the decoding of the information block with the further reduced effective signal-to-interference ratio.

3. The method of claim 1, wherein whether the information block is correctly decoded is determined based on cyclic redundancy check information for the information block.

4. The method of claim 1, wherein the effective signal-to-interference ratio is reduced by at least one of adding pseudo-noise to soft decision values generated by the decoding, varying a code rate and/or a puncturing for the decoding, and changing a soft-value quantization of the decoding.

5. The method of claim 1, further comprising the step of adaptively adjusting a step size of a signal-to-interference ratio target in an outer power control loop algorithm based on the excess signal-to-interference ratio of the channel.

6. The method of claim 5, wherein the step size is adaptively adjusted by repetitively decoding the received information block and reducing the effective signal-to-interference ratio of the received information block by successively larger amounts.

7. The method of claim 5, wherein if the excess signal-to-interference ratio is large, the step size is larger than the step size if the excess signal-to-interference ratio is small.

8. The method of claim 5, wherein if the information block is decoded incorrectly, the signal-to-interference ratio target is not changed.

9. The method of claim 5, wherein the step size is adaptively adjusted based on at least one of information type and channel propagation conditions.

10. The method of claim 5, further comprising the step of generating a transmit power control command based on the adaptively adjusted step size and on an estimate of the signal-to-interference ratio.

11. An apparatus for a communication system, comprising:
a decoder configured to decode received information blocks and to generate respective flag signals that indicate whether respective information blocks are correctly decoded; and
an excess signal-to-interference ratio estimator configured to receive the flag signals, to cause the decoder to decode at least one already decoded information block with a reduced effective signal-to-interference ratio, and to generate an estimate of an excess signal-to-interference ratio based on the decoded information block with the reduced effective signal-to-interference ratio;
wherein the excess signal-to-interference ratio is related to a difference between the signal-to-interference ratio of the received information block and a minimum signal-to-interference ratio needed for decoding the received information block.

12. The apparatus of claim 11, wherein if the excess signal-to-interference ratio estimator is configured to cause the decoder to decode at least one information block already decoded with a reduced effective signal-to-interference ratio with a further reduced effective signal-to-interference ratio and to generate the estimate of the excess signal-to-interference ratio based on decoding the information block with the further reduced effective signal-to-interference ratio.

13. The apparatus of claim 11, wherein the decoder is configured to determine whether an information block is correctly decoded based on cyclic redundancy check information for the information block.

14. The apparatus of claim 11, wherein the decoder is configured to reduce the effective signal-to-interference ratio by at least one of adding pseudo-noise to soft decision values generated by the decoder, varying a code rate and/or a puncturing for decoding, and changing a soft-value quantization of the decoder.

15. The apparatus of claim 11, wherein the decoder is one of a Turbo decoder and a convolutional decoder.

16. The apparatus of claim 11, further comprising a regulator configured to generate a signal-to-interference ratio target based on the excess signal-to-interference ratio and on a block error rate target, wherein the regulator adjusts the signal-to-interference ratio target with a step size based on the excess signal-to-interference ratio.

17. The apparatus of claim 16, wherein the step size is adaptively adjusted by repetitively decoding the received information block and reducing the effective signal-to-interference ratio of the received information block by successively larger amounts.

18. The apparatus of claim 16, wherein if the excess signal-to-interference ratio is large, the step size is larger than the step size if the excess signal-to-interference ratio is small.

19. The apparatus of claim 16, wherein if an information block is decoded incorrectly, the signal-to-interference ratio target is not adjusted.

20. The apparatus of claim 16, wherein the regulator adaptively adjusts the step size based on at least one of information type and channel propagation conditions.

21. The apparatus of claim 11, wherein the apparatus is included in a wireless communication device.

22. A computer-readable medium containing a computer program for determining an excess signal-to-interference ratio of a channel in a communication system, the computer program implementing the steps of:
decoding an information block received through the channel;
if the information block is decoded correctly, then reducing an effective signal-to-interference ratio of the received information block and decoding the information block with the reduced effective signal-to-interference ratio; and
determining an excess signal-to-interference ratio of the channel based on the decoding of the information block with the reduced effective signal-to-interference ratio;
wherein the excess signal-to-interference ratio is related to a difference between the signal-to-interference ratio of the received information block and a minimum signal-to-interference ratio needed for decoding the received information block.

* * * * *